March 2, 1971   M. DELATTRE ET AL   3,566,495

ADJUSTABLE CLAMPING DEVICE FOR TOOL HOLDERS

Filed Nov. 14, 1968

INVENTORS
Marcel Delattre
Georges Notari
Gerard Romagnolo

BY Webb, Burden, Robinson & Webb

THEIR ATTORNEYS

United States Patent Office 3,566,495
Patented Mar. 2, 1971

3,566,495
ADJUSTABLE CLAMPING DEVICE FOR TOOL HOLDERS
Marcel Delattre and Gerard Romagnolo, Echirolles, and Georges Notari, Monte Carlo, Monaco, assignors to Ugine-Carbone, Paris, France
Filed Nov. 14, 1968, Ser. No. 775,833
Claims priority, application France, Nov. 15, 1967, 128,292
Int. Cl. B26d 1/00
U.S. Cl. 29—96          5 Claims

ABSTRACT OF THE DISCLOSURE

An adjustable clamping device for securing cutting tools or tips to the shank of a tool holder comprising a clamping member and a chip breaker positioned within a guideway provided therefor in the clamping member. The chip breaker can be positioned within the guideway by turning a cam journaled in the clamping member and engaged in the chip breaker.

BACKGROUND

Commonly used tool holders are comprised of a massive shank which carries a removable throw-away tip or tool and a clamping member fastened to the shank which can be tightened against the throw-away tool thereby securing it in place. Preferably, a piece named a chip breaker is inserted between the clamping member and the tool. It is desirable to be able to adjust the chip breaker in a direction perpendicular to the cutting edge of the tool.

According to this invention, there is provided an adjustable clamping device for securing a cutting tool to the shank of a tool holder which enables continuous adjustment of the position of the chip breaker. It is an advantage of this invention that the chip breaker remains fixed relative to the cutting edge when the clamping member is loosened from the shank for replacement of the throw-away tool. This enables one to change the throw-away tool very rapidly since readjustment of the position of the chip breaker is not necessary. Another advantage of the clamping member, according to this invention, is that it is adaptable for use on various tool holders so long as the tool is mounted on the same side of the shank. For example, tool holders may be designed to be fitted with tips positioned at angles from 0 to 90° to the axis of the shank. The clamping member, according to this invention, may be used to secure the tools to any one of these tool holders which would, of course, result in appreciable saving due to the decrease in the number of spare parts that must be stocked.

According to this invention, there is provided an adjustable clamping device for securing a cutting tool to the shank of a tool holder. One side of the shank is designated a bearing face and has a slotted edge adjacent thereto for receiving the cutting tool. The clamping device comprises a clamping member, chip breaker, cam and means for tightening the clamping member against the bearing face of the shank. There is a guideway in the face of the clamping member adjacent the bearing face of the shank. This guideway is substantially perpendicular to the slotted edge of the shank. The chip breaker has a top and bottom face and is slideably positioned within the guideway having a front end partially over the cutting tool. The chip breaker has a groove in its top face substantially perpendicular to the guideway. The cam is journaled in the clamping member substantially above the guideway and has an eccentric protuberance engaging the groove in the chip breaker. The chip breaker may be positioned within the guideway by turning the cam.

Figures 1, 2:
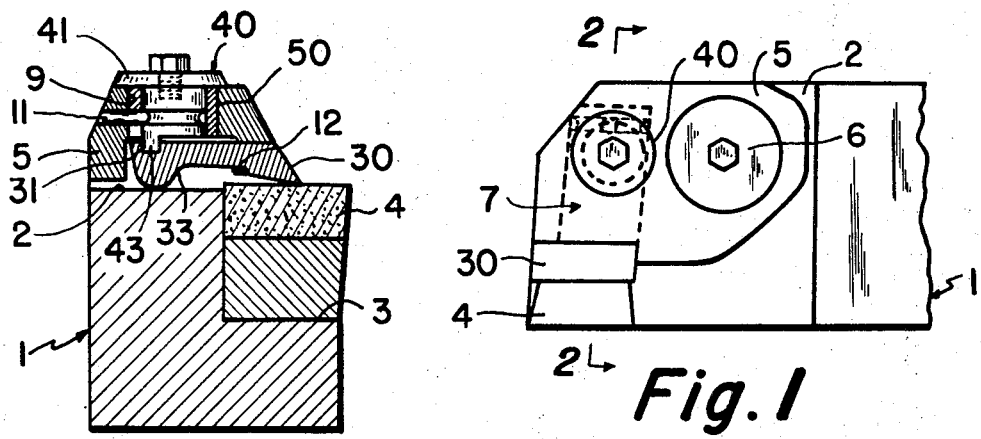
Figures 4, 5:
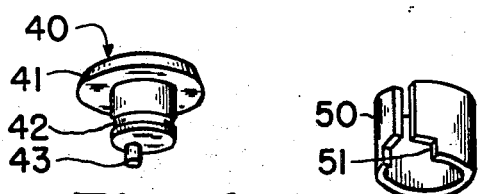
Figure 3:
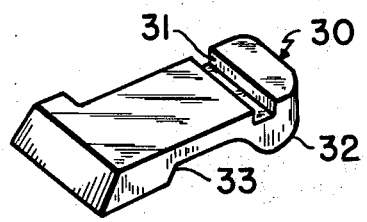
Figure 6:
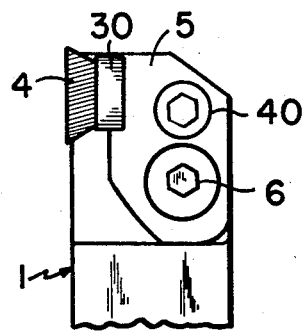
Figure 7:
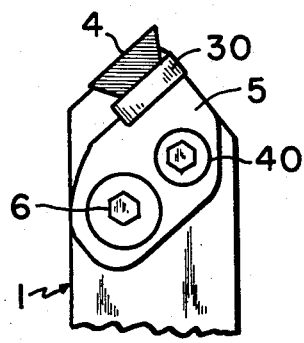
Figure 8:
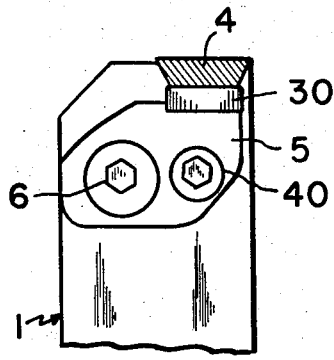

In the drawings, FIG. 1 is a plan view of a clamping device according to this invention. FIG. 2 is a section view along line 2—2 in FIG. 1. FIG. 3 is a perspective view of a suitable chip breaker according to this invention. FIG. 4 is a perspective view of a suitable cam according to this invention. FIG. 5 is a perspective view of a suitable elastic cylinder according to this invention. FIGS. 6, 7 and 8 are plan views of a clamping device according to this invention used on three different shanks whereby the angle of the cutting tool is varied between 0 and 90° to the axis of the shank. Throughout the drawings, the same reference numbers are used on the same elements.

Referring now to FIGS. 1 and 2, the shank of the tool holder 1 has a bearing surface 2 and a slotted edge 3 for receiving the cutting tool 4. The clamping member 5 is bored to provide a first hole for passing a screw 6 or other suitable fastener to fix the clamping member to the bearing face of the shank of the tool holder. On the face of the clamping member adjacent the bearing face of the shank there is provided a guideway 7 having at least two lateral guiding walls. A chip breaker 30 is slideably positioned within the guideway and is shown also in perspective in FIG. 3. In FIGS. 1 and 2, the chip breaker is shown in its most rearward position. A portion of the chip breaker is positioned over the bearing surface of the shank and the remaining portion of the chip breaker is positioned over the tool. The chip breaker has top and bottom faces. The top face adjacent the guideway has a groove 31 substantially perpendicular to the guideway.

A second hole 9 is bored in the clamping member parallel to the first one, substantially over the guideway 7. Journaled within the second hole are an elastic cylinder 50 as shown in FIG. 5 and a cam 40 as shown in FIG. 4. There is a flange 41 on the cam for bearing on the top of the clamping member. The cam has the circumferential groove 42 centrally located and an eccentric protuberance 43 extending from its lower end. The protuberance engages in the groove 31 on the top face of the chip breaker 30. The elastic cylinder 50, concentrically located about the cam, has a recess 51 adjacent the groove 42 in the cam. Keying means 11 secured in the clamping member passes through the recess 51 and into the groove 42 thus preventing movement of the elastic cylinder about its axis or movement of the cam perpendicular to its axis. The elastic cylinder holds the cam tightly in position but permits the adjustment of the cam using a hand wrench. By turning the cam, the chip breaker may be positioned within the guideway of the clamping member. The bottom face of the chip breaker preferably has a recess 33 for positioning a flat spring 12 or other biasing means. Preferably, the flat spring is secured to the fixing screw 6. It is preferable that the bottom face of the chip breaker be shaped to contact the bearing face of the shank over a narrow width at one end, designated the rear end, and to contact the cutting tool near its front end. It is preferable that the back end of he chip breaker and the bottom surface near the back end form a continuous curved surface 32, that is, be substantially cylindrical or beveled. In this way, the back end of the chip breaker only contacts the bearing face on a line or narrow width. Thus, the pressure of the clamping member applied inside a rectangle, constituting the back of the chip breaker and the front of the chip breaker, will concentrate pressure on the cutting tool.

The lower face of the clamping member may have several feet or guides for engaging guide holes provided in the bearing surface of the shank. In this way, the clamping member is easily positioned on any tool holder. FIGS. 6, 7 and 8 show the same clamping devices used on different tool holders to position the tool or tip at angles of 0, 45 and 90° to the axis of the shank.

Having thus described our invention with the detail and particularity required by the patent laws, what is desired to be protected by Letters Patent is as follows:

1. An adjustable clamping device for securing a cutting tool to the shank of a tool holder (1), said shank having one side designated a bearing face (2) and a slotted edge (3) adjacent the bearing face for receiving the cutting tool (4), said clamping device comprising a clamping member (5), chip breaker (30), cam (50) and means (6) for tightening the clamping member against the bearing face of the shank, there being a guideway (7) in the face of clamping member adjacent the bearing face of the shank, said guideway substantially perpendicular to the slotted edge of the shank, said chip breaker having top and bottom faces, said bottom face adjacent the bearing face of the shank, said chip breaker slidably positioned within the guideway having a front end partially over the cutting tool and a back end over the bearing surface, said chip breaker having a groove (31) in its top face substantially perpendicular to the guideway, said cam journaled in the clamping member substantially above the guideway and having an eccentric protuberance (43) engaging the groove in the chip breaker such that the chip breaker can be positioned in the guideway by turning the cam.

2. An adjustable clamping device according to claim 1 wherein the bottom face of the chip breaker is shaped to contact the bearing face of the shank over a narrow width at the back of the chip breaker such that pressure is concentrated over the cutting tool when the clamping member is tightened against the bearing surface of the shank.

3. An adjustable clamping device according to claim 2 in which the back and the bottom surface near the back end of the chip breaker form substantially continuous curved surface.

4. An adjustable clamping device according to claim 2 comprising, in addition, an elastic cylinder concentrically positioned about the cam, said cam having a circumferential groove centrally located, said cylinder having a keyway therein aligned with circumferential groove in the cam, there being a keying means secured to the clamping member passing through the keyway in the cylinder and into the groove in the cam thereby preventing rotation of the cylinder about its axis and movement of the cam perpendicular to its axis, said cylinder biased against the cam preventing it from turning freely.

5. An adjustable clamping device according to claim 4 wherein a biasing means is positioned between the chip breaker and the bearing surface of the shank.

References Cited
UNITED STATES PATENTS

| | | | |
|---|---|---|---|
| 2,860,402 | 11/1958 | Proksa | 29—96 |
| 3,113,372 | 12/1963 | Hargreaves | 29—96 |
| 3,134,162 | 5/1964 | Emmerich et al. | 29—96 |
| 3,191,262 | 6/1965 | Gustafson | 29—96 |
| 3,216,066 | 11/1965 | Kryszek | 29—96 |
| 3,369,284 | 2/1968 | Stier | 29—96 |

HARRISON L. HINSON, Primary Examiner